United States Patent

Rickels

[11] Patent Number: 5,813,937
[45] Date of Patent: Sep. 29, 1998

[54] EPICYCLIC CHANGE SPEED GEAR HUBS

[75] Inventor: Stephen Terence Rickels, Nottingham, United Kingdom

[73] Assignee: Sturmey-Archer Limited, Nottingham, United Kingdom

[21] Appl. No.: 513,785

[22] PCT Filed: Feb. 28, 1994

[86] PCT No.: PCT/GB94/00394

§ 371 Date: Dec. 26, 1995

§ 102(e) Date: Dec. 26, 1995

[87] PCT Pub. No.: WO94/20358

PCT Pub. Date: Sep. 15, 1994

[30] Foreign Application Priority Data

Mar. 2, 1993 [GB] United Kingdom ................... 9304189

[51] Int. Cl.$^6$ .............................. B62M 11/16; F16H 3/66
[52] U.S. Cl. ........................................... 475/297; 475/298
[58] Field of Search ..................................... 475/296, 297, 475/298

[56] References Cited

U.S. PATENT DOCUMENTS

| | | | |
|---|---|---|---|
| 3,908,807 | 9/1975 | Ozaki et al. .............................. | 192/6 A |
| 3,973,451 | 8/1976 | Kine ........................................ | 475/297 |
| 5,399,128 | 3/1995 | Nurberger ................................. | 475/298 |
| 5,445,573 | 8/1995 | Nurnberger .............................. | 475/298 |

FOREIGN PATENT DOCUMENTS

| | | |
|---|---|---|
| 18076 | 10/1985 | European Pat. Off. . |
| 3732977 | 4/1989 | Germany . |
| 2249364 | 10/1991 | United Kingdom . |

*Primary Examiner*—Khoi Q. Ta
*Attorney, Agent, or Firm*—Salter & Michaelson

[57] ABSTRACT

An epicyclic change speed gear includes a fixed spindle, input and output members, planet pinions disposed in a planet cage, a gear ring which is operatively connected to one of the output member and input member, a clutch operative to connect the input member to one of the planet cage and input member to the gear ring, and axially moveable sun pinions which are resiliently loaded into abutting side-by-side disposition and are rotatable on the spindle. One of the sun pinions is operable to provide a reaction member when locked to the spindle. A gear selector key is disposed radially inwardly of the sun pinions and capable of engaging one of the sun pinions on movement of the selector key in the axial direction of the hub in order to lock the corresponding sun pinion to the spindle to provide the reaction member. The selector key includes a support rod, first and second body parts mounted on the rod for limited relative movement in the axial direction thereof, and a spring. The key further controls the operative condition of the clutch and thereby the connection of the input member to one of the planet cage and the gear ring.

4 Claims, 7 Drawing Sheets

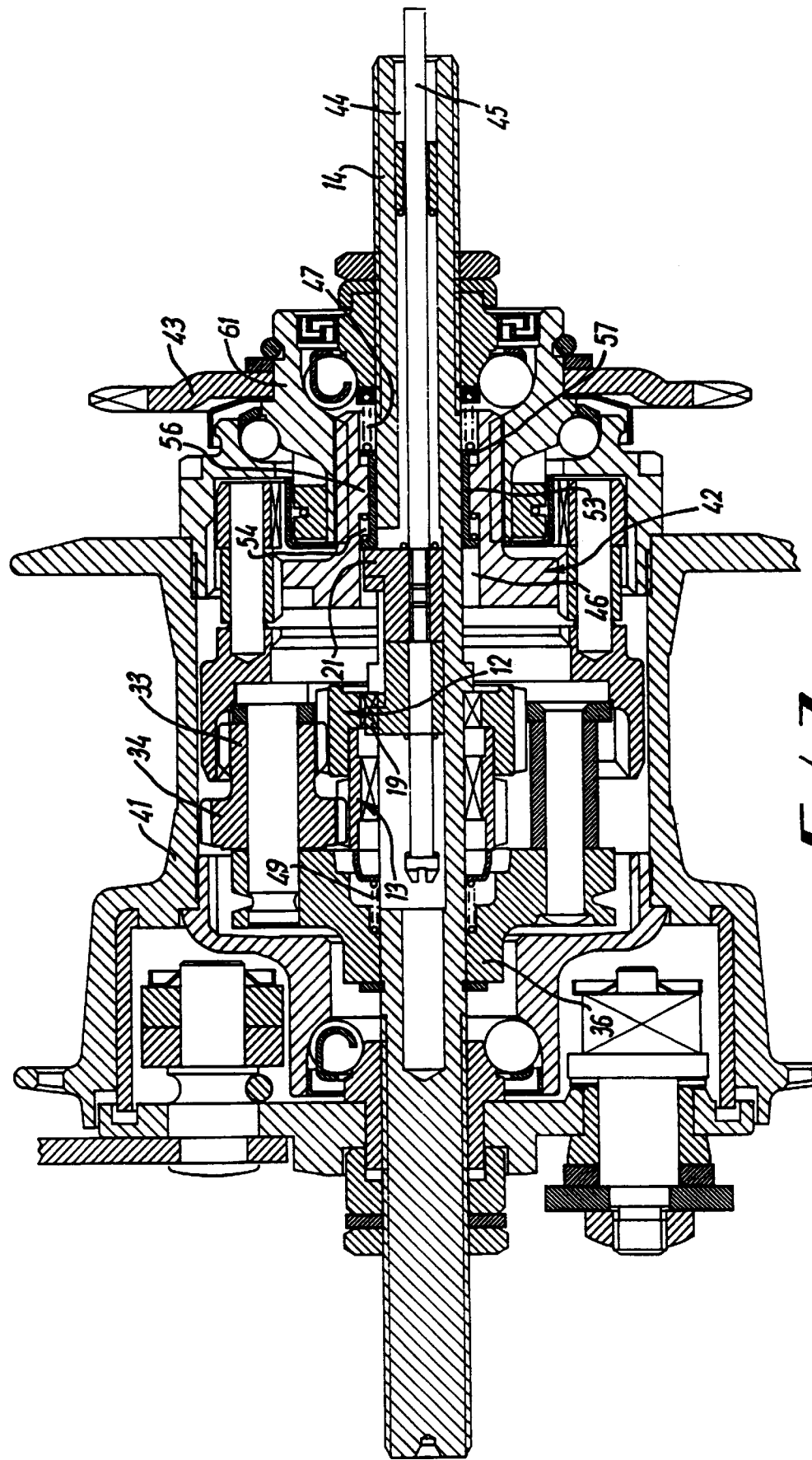

EPICYCLIC CHANGE SPEED GEAR HUBS

BACKGROUND AND SUMMARY OF THE INVENTION

The invention concerns epicyclic change speed gear hubs for bicycles and the like, and has more particular reference to hubs having two or more sun gears selectively engageable with respective gear elements of compound planet gears in a drive transmission mode.

It is known in the art to provide a five speed epicyclic change speed gear hub for a bicycle by utilising compound planet gears engaged with a common gear ring and each cooperable with a respective sun gear selectively engageable therewith in a drive transmission mode.

In such an arrangement the sun gears are rotatably and slidably mounted on the hub spindle for unitary movement in the axial direction thereof for the selective dogged engagement of one or other of the sun gears with a respective formation non-rotatably fixed to the spindle.

The planet cage of the aforesaid arrangement is connectable with the hub shell, so as to provide a drive transmission from the planet cage to the hub shell according to hub condition, by means of axially movable pawls mounted in the planet cage and cooperable with ratchet teeth provided in a hub end cap. The gear ring is connectable with the hub shelf through radial pawls.

It is also known from our copending Patent Application No. GB-A-2249364 for a sun gear to be axially fixed with respect to the spindle and to provide a selector key movable axially of the spindle for selective engagement with a respective one of the sun gears so as non-rotatably to secure that sun gear to the spindle.

A further arrangement in which a selector key is moveable axially of a spindle is described in EP-A-0 180 076. This key moves in a slot which extends through the spindle and which is operative to control a clutch. In addition a selector sleeve having dogs is provided to move axially on splines on the spindle in order to lock one or other of the sun gears to the spindle. This is a complex arrangement which is difficult to produce.

The object of the present invention is to provide an alternative means whereby the respective sun gears might selectively be brought into a drive transmission mode, and preferably one such as will allow of the use of a single cable in effecting gear change through the full range of available gears.

According to the present invention there is provided an epicyclic change speed gear comprising a fixed spindle, an input member and an output member, planet pinions disposed in a planet cage which may be operatively connected to the output member or the input member, a gear ring which may be operatively connected to the output member or input member, a clutch operative to connect the input member to the planet cage or the input member to the gear ring, side-by-side sun pinions rotatable on the spindle one or other of which is operable to provide a reaction member when locked to the spindle and a gear selector key disposed radially inwardly of said sun pinions and adapted for selective cooperative engagement with one or other of the said sun pinions on movement of the selector key in the axial direction of the hub in order to lock the corresponding sun pinion to the spindle to provide the reaction member, the selector key including a support rod, first and second body parts mounted on said rod for limited relative movement in the axial direction thereof, and resilient means resisting said relative movement characterised in that in addition to locking one or other of the sun pinions the key also serves to control the operative condition of the clutch and thereby the connection of the input member to the planet cage or the gear ring as the case may be.

According to a preferred feature, each body part includes an outward extending dog for cooperative engagement with splines provided internally of the sun pinions.

According to a still further preferred feature, the sun pinions are resiliently loaded into abutting side-by-side disposition.

According to a still further preferred feature, the gear selector key is movable into axial abutment with a selector sleeve of the epicyclic change speed hub to effect axial displacement thereof.

According to a preferred feature the clutch sleeve has a radially outwardly directed lip at it inner end and the selector sleeve has an internal rib, the lip being an interference fit with said rib, and the resilient means comprising a helical compression spring interposed therebetween.

BRIEF DESCRIPTION OF THE DRAWINGS

The invention will now be described further, by way of example only with reference to the accompanying drawings in which:

FIGS. 4 to 7 are views similar to FIG. 1 and shown the relative disposition of parts appropriate to the successive gear conditions of the hub between high gear and super low gear.

DETAILED DESCRIPTION OF THE PREFERRED EMBODIMENTS

Figure 1:
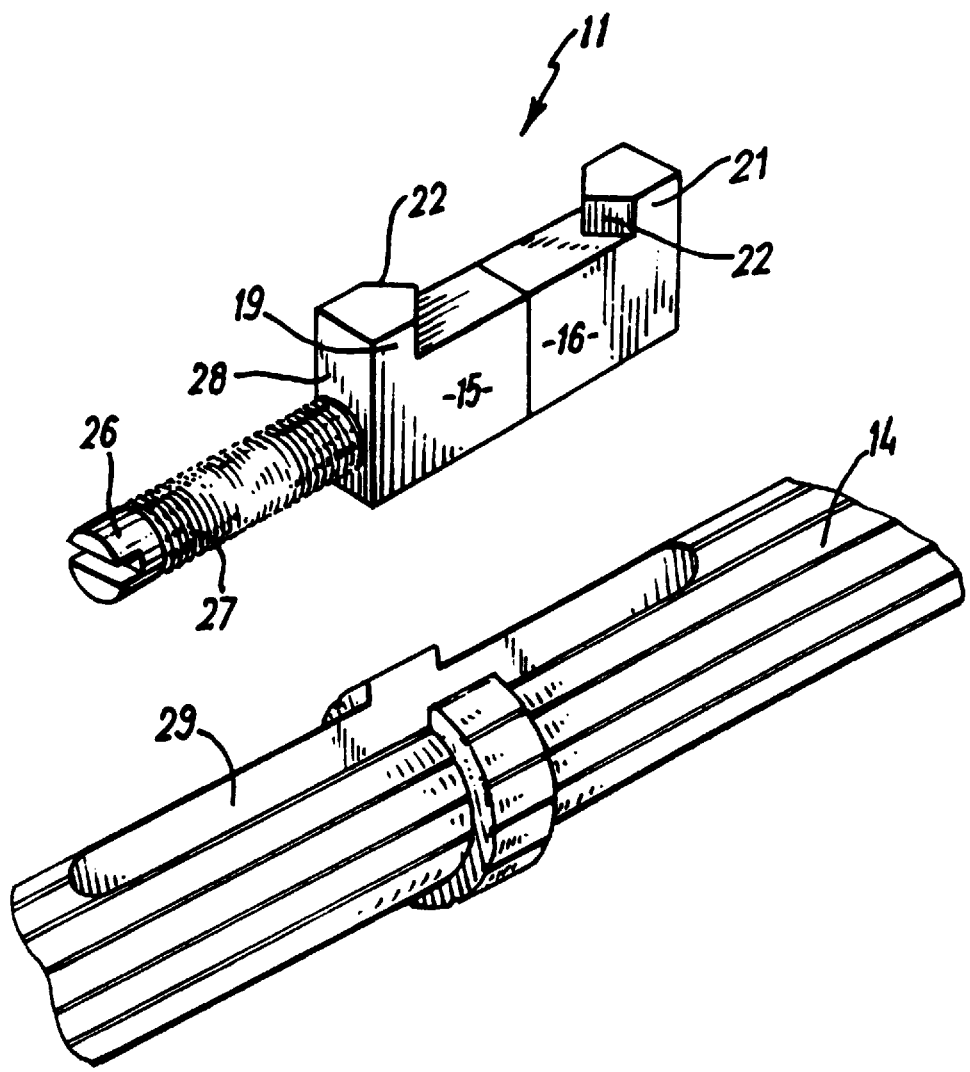
FIG. 1 is an exploded perspective view of the split selector key of the present invention and a hub spindle.
Figure 2:
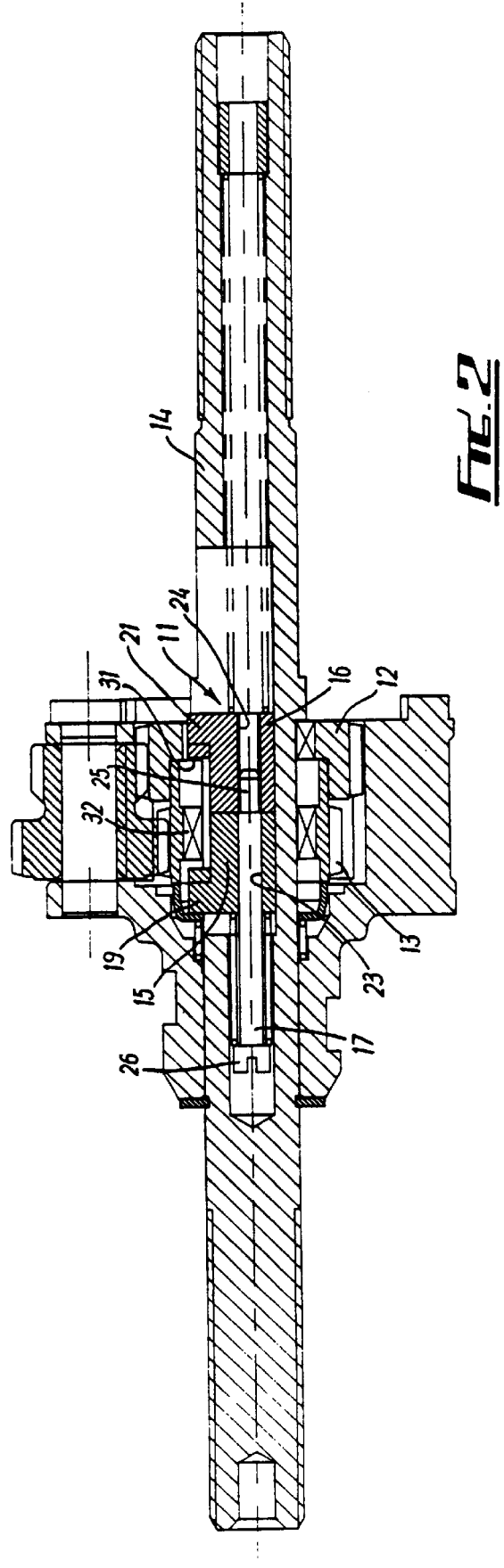
FIG. 2 shows a section through the selector key of FIG. 1 in position relative to the sun pinions and planet gears of a coaster change speed hub, and in a particular gear condition of the hub, and illustrates the manner in which the key serves to lock one of the sun pinions in drive transmission relationship with respect to the hub spindle.

Referring now to the drawings, and particularly to FIGS. 1 and 2 thereof, a split selector key (11) whereby primary and secondary sun pinions (12, 13) freely rotatably arranged in side-by-side disposition on the spindle (14) of a bicycle change speed hub, and selectively locked in relation to that spindle (14), comprises first and second rectangular body parts (15, 16) arranged in abutting relationship and mounted on a support rod (17) for relative movement in the axial direction thereof.

Integral dogs (19, 21) are provided at the upper face, as seen in the drawing, of body parts (15, 16) the dogs (19, 21) being at the remote ends of said body parts and the inwardly facing surfaces thereof being bevelled as at (22). Aligned through bores (23, 24) are provided in body parts (15, 16) respectively, bore (23) being clearance on rod (17) whilst bore (24) is of lesser diameter and is screw-threaded to receive a complementarily threaded reduced diameter end region (25) of rod (17). The opposite end of rod (17) has an enlarged head (26), and a helical compression spring (27) is provided about rod (17) and between the head (26) and the adjacent face (28) of body part (15).

As will be appreciated, in the assembled condition of the selector key (11), body part (15) will be capable of limited movement on rod (17) relative to body part (16) against the restraint of spring (27) and will ordinarily be loaded into face-to-face abutment with body part (16) by said spring (27).

The split selector key (11) is located in a slot (29) in hub spindle (14) at a position radially inwardly of side-by-side primary and secondary sun pinions (12, 13) and, by provided for movement of said key (11) in the axial direction of the spindle, the dogs (19, 21) can be brought into selective cooperative engagement with splines (31, 32) inwardly of sun pinions (12, 13) respectively, thereby to lock the selected sun pinion to the spindle (14) in drive transmission mode.

Referring now to FIGS. 3 to 7, in which like numerals to those of FIGS. 1 and 2 are used for same or similar parts, the five speed epicyclic change speed hub shown therein comprises primary and secondary sun gears (12, 13) freely rotatable on spindle (14) and essentially axially located with respect thereto. The sun gears (12, 13) are in driving engagement with respective gear elements (33, 34) of compound planet gears (35) only one of which is shown, rotatably mounted in a planet cage (36), whilst the compound gears (35) are drivingly engaged with a gear ring (37).

Unidirectional clutches (38, 39) are provided between the planet cage (36) and hub shell (41) and between the gear ring (37) and hub shell (41), and a manually actuable selector mechanism is provided to determine the drive transmission path from an input sprocket to and through the operative epicyclic gear.

The hub illustrated includes a cable actuated hub brake, but such brake is of conventional construction and forms no part of the present invention.

The manually actuable selector mechanism comprises a selector sleeve (42) and the selector key (11).

Selector sleeve (42) receives an input drive from chain sprocket (43) and transmits such drive to planet cage (36) according to the axial position of the selector sleeve (42) within the hub, and serves also to control the operative condition of various of the unidirectional clutches (38, 39), all in known manner.

Selector key (11) is located in elongate slot (29) in hub spindle (14), there being a blind axial bore (44) in said spindle (14) extending to and beyond the said slot (29), the bore (44) being clearance on a control rod (45), the end of which is screw-threadedly engaged with the outer end of bore (24) in body part (16), by which the key (11) is axially adjusted for gear change. That part (44a) of bore (44) which extends beyond the slot (29) is clearance on and of sufficient length to accommodate that part of support rod (17) which extends from the body parts (15, 16).

In addition to selectively securing one or other of the sun gears (12, 13) in non-rotatable relationship to the spindle (14) according to its axial position relative thereto, selector key (11) also effects axial adjustment of selector sleeve (42), the outer end of body part (16) being engageable with bore (46) to the selector sleeve (42) to bear against an internal flange (56) therein in a manner hereinafter to be described, and thus effect axial adjustment of said sleeve (42) against the restraint of a return spring (47).

As is shown in the drawing, primary sun pinion (12) abuts against a rib (48) on the spindle (14) and is resiliently loaded against said rib by a compression spring (49) acting on secondary sun piston (13) through a cup (51), the sun pinions thus being capable of limited movement against the restraint of spring (49).

In contradistinction to conventional practice, wherein a clutch nut extending through the hub spindle makes direct contact with the selector sleeve to move said sleeve against spring restraint on gear change in one direction, in the present instance axial displacement of the selector sleeve (42) against the restraint of return spring (47) is through a lipped clutch sleeve (53) provided between the selector sleeve (42) and hub spindle (14), the lipped end of clutch sleeve (53) bearing against the element by which the selector sleeve is axially displaced for gear control purposes, in this case the selector key (11), and there being a compression spring (54) between lip (55) and an internal flange (56) to the selector sleeve. A washer (57) is provided about the spindle at the opposite end of the clutch sleeve (53) and bears against the annular end face thereof, the washer (57) being dimensioned for engagement with the outer flank of rib (56) and spring (52) acting on such washer (57) in loading the selector sleeve ((47) inwardly of the hub.

By providing the arrangement comprising clutch sleeve (53) and spring (54) between the selector key (11) and the selector sleeve (42) and effecting adjustment of the selector sleeve (42) through the clutch sleeve (53) and related spring (54) we have been able to reduce the space requirement within the hub, the arrangement allowing of a reduction in the extend of axial movement of the selector sleeve (42) as the selector key (11) moves to bring dog (19) on body part (15) out of engagement with secondary sun pinion (13) and into engagement with primary sun pinion (12) in shifting between low gear and super low gear than would otherwise be the case.

The facility of limited relative axial movement between the sun pinions (12, 13) provided by spring (49) and cup (51) and between the body parts (15, 16) as provided by spring (27) makes possible the temporary separation of the pinions (12, 13) or body parts (15, 16) on gear change in the event of misalignment between the dogs (19, 21) with the splines provided internally of the relevant gear until such time as accurate alignment occurs and engagement can take place.

Figure 3:
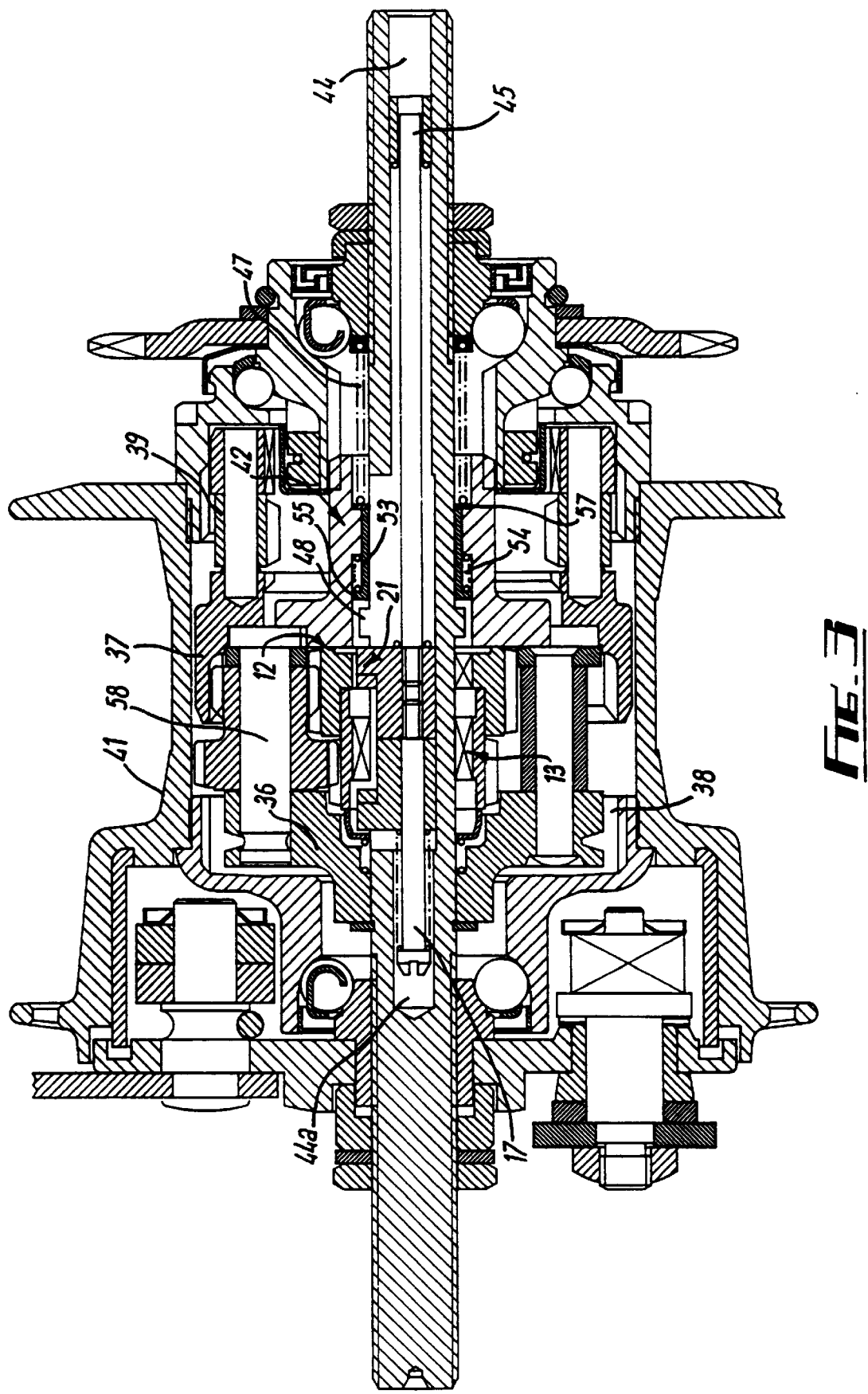
FIG. 3 is an axial section through a five speed bicycle epicyclic change speed hub including the selector key shown in FIGS. 1 and 2, the relative disposition of parts being consistent with a super high gear condition of the hub.
Figure 4:
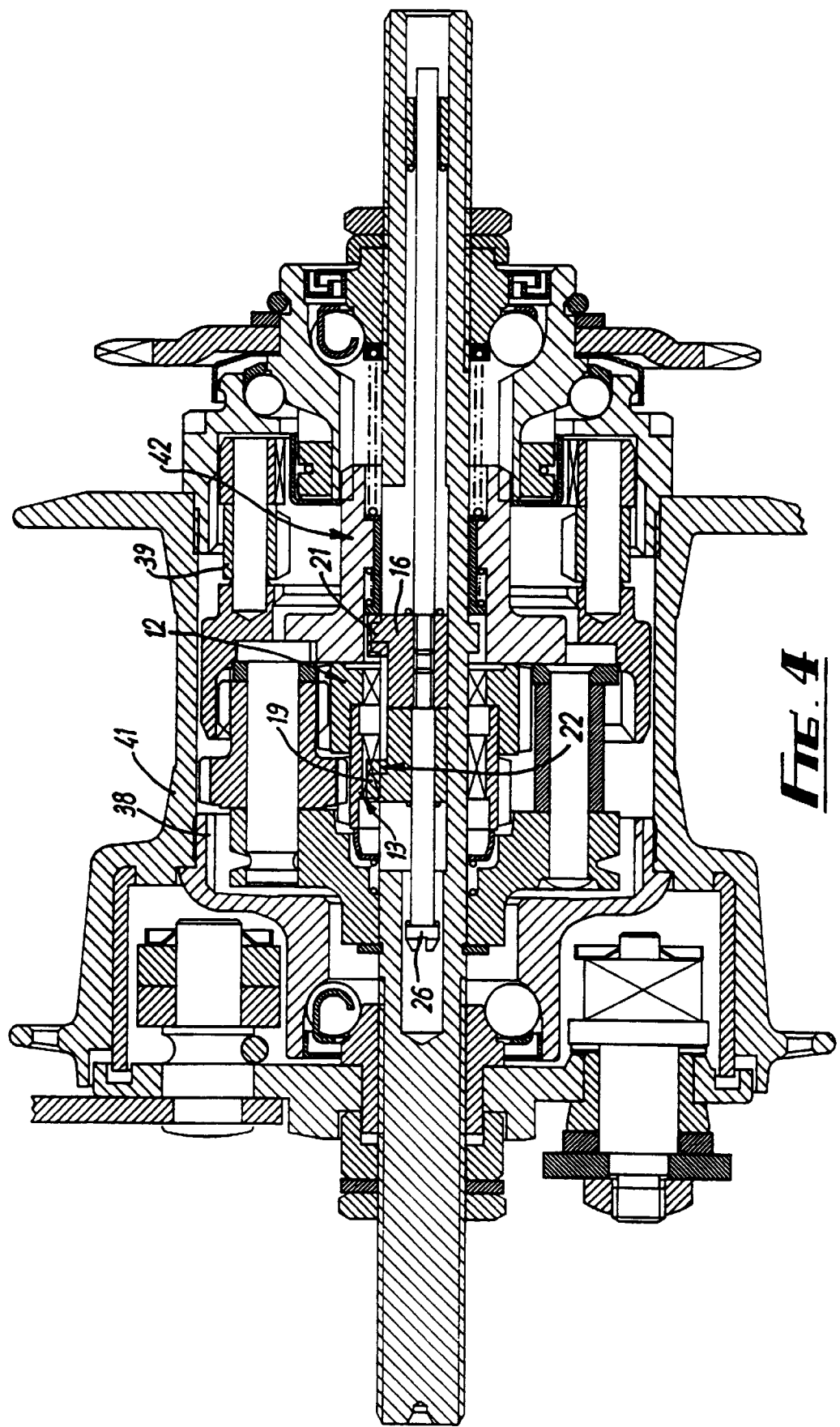
Figure 5:
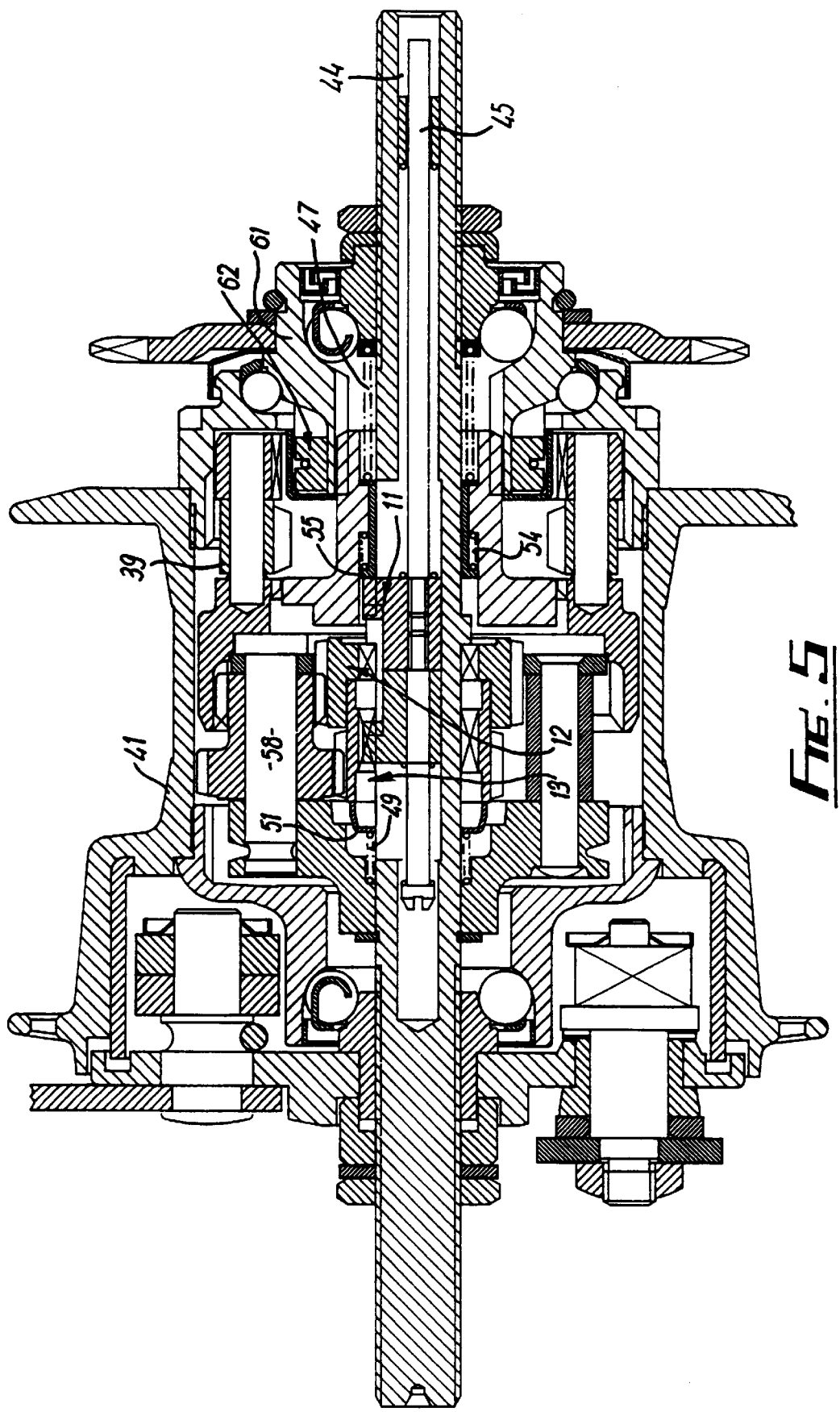
Figure 6:
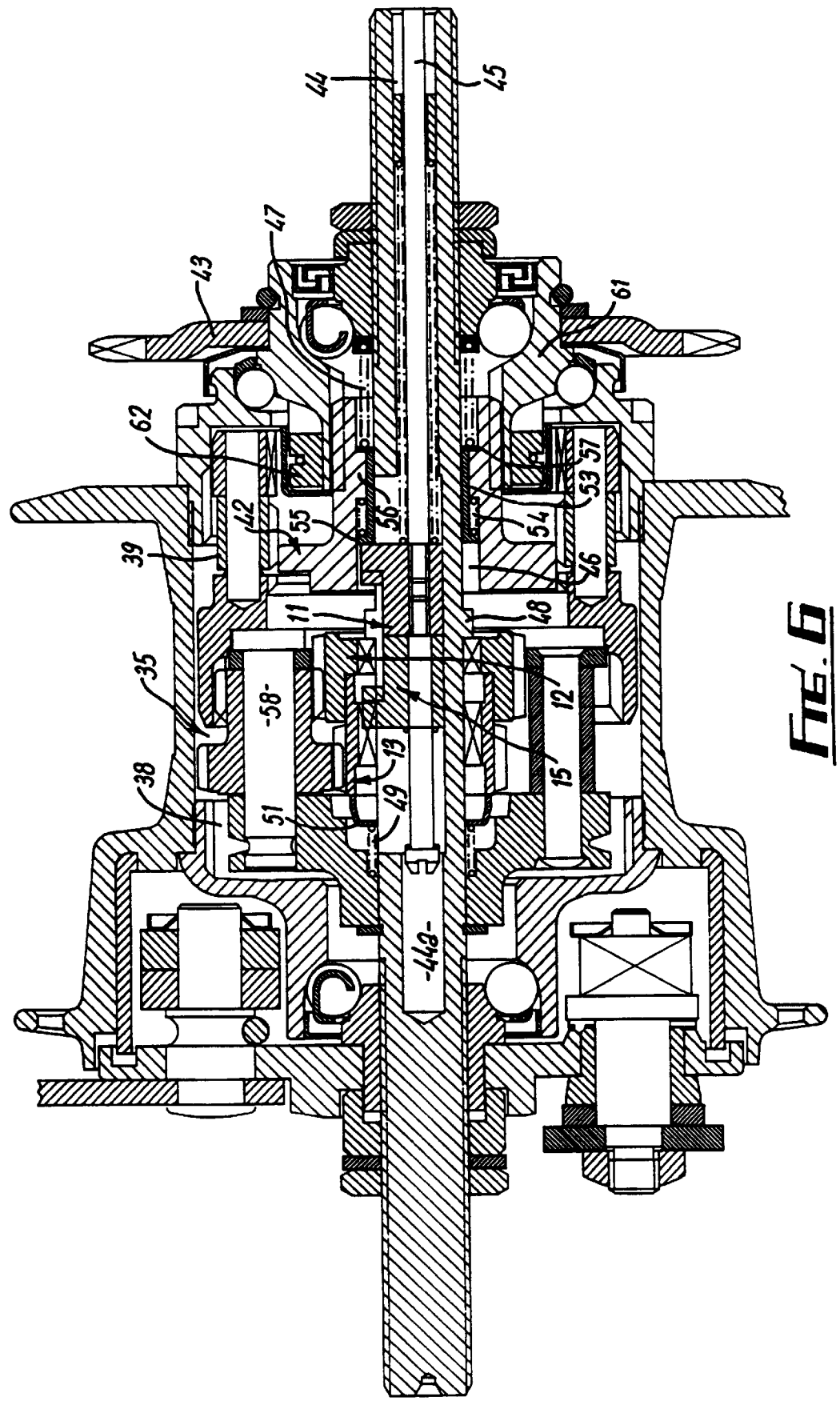

The relative disposition of parts for the individual gear conditions of the hub are shown in FIGS. 3 to 7, FIGS. 3 and 7 showing the super high and super low gears, respectively, for which the primary sun pinion (12) is locked to the hub spindle (14) and FIGS. 4, 5 and 6 showing the hub in high, normal and low gear condition respectively for which the secondary sun pinion (13) is locked to the hub spindle (14) and is in drive transmission mode.

Movement of the selector key axially of the hub is effected through control rod (45) in conventional manner, and progressive movement of the selector key (11) to the right from the position shown in FIG. 3 to that shown in FIG. 7 by appropriate increments will adjust the hub successively from super high gear to super low gear.

In FIGS. 3 and 4 it will be noted that the sun pinions (12, 13) have been pushed inwardly of the hub by the selector sleeve (42), whilst in the remaining gears the pinions are located against rib (48) on spindle (14) by compression spring (49).

In adjustment from the super high gear condition of FIG. 3 to the high gear condition of FIG. 4, the dog (21) on body part (16) moves out of engagement with the splines of the primary sun pinion (12) whilst dog (19) on body part (15) engages the splines of secondary sun pinion (13), there being no axial adjustment of the selector sleeve (42) and such selector sleeve (42) being drivingly engaged with planet pins (58) thus to rotate planet cage (36), in both gear conditions, the drive transmission path being from the planet cage (36)

to the gear ring (37) and thence to the hub shell (41) through unidirectional clutch (39), the gear ratio being determined according to the sun pinion secured in a drive transmission mode.

Further adjustment of the selector key (11) to the right, as seen in the drawings will move the selector sleeve (42) out of operative engagement with the planet pins (58), and will give a direct drive to the hub shell from driver (51) through pawls (62), gear ring (37) and unidirectional clutch (39). At the same time the sun pinions (12, 13) move into abutment within (48) under the effect of spring (49) operating through cup (51), to ensure extra engagement of dog (19) with secondary sun pinion 13 in low gear.

A still further adjustment of the selector key (11) moves the selector sleeve (42) to a position wherein the pawls of unidirectional clutch (39) are tripped, and the drive transmission path is to the gear ring (37) through the epicyclic gear to the hub shelf (41) by way of unidirectional clutch (38). The dog (19) on body part (15) is still engaged with the splines provided internally to the secondary sun pinion (13), and such pinion forms a part of the effective epicyclic gear.

On still further movement of the selector key dog (19) is disengaged from the secondary sun pinion (13) and dog (19) is brought into engagement with the primary sun pinion (12) which then becomes a part of the effective epicyclic gear, the drive transmission path again being to the gear ring (37), through the epicyclic gear to unidirectional clutch (38) and thence to the hub shell (41).

The invention is not restricted to the detail of the embodiment hereinbefore described, since alternatives will readily present themselves to one skilled in the art.

Thus, for example, whilst it is preferred to provide a resiliently loaded clutch sleeve (42) through which motion of the selector key is transmitted to the selector sleeve, the inclusion of such an arrangement is by no means essential. Its inclusion, however, does offer the advantage of a reduced space requirement within the hub, and this is of significance in hub design where economies of space are of paramount importance.

The spring loading of the sun pinions (12, 13) may be omitted, if desired, although the provision of such feature does facilitate gear change in circumstances where initial engagement with the splines of a sun gear is involved.

Whilst the invention is of application to change speed gear hubs having integral brakes, and is indeed illustrated in the context of one such hub, it does, of course, have application in hubs which do not incorporate a brake.

What is claimed is:

1. An epicyclic change speed gear comprising a fixed spindle, an input member and an output member, planet pinions disposed in a planet cage which is operatively connected to one of the output member and the input member, a gear ring which is operatively connected to one of the output member and input member, a clutch operative to connect the input member to one of the planet cage and input member to the gear ring, axially movable sun pinions which are resiliently loaded into abutting side-to-side disposition and are rotatable on the spindle, one of the sun pinions being operable to provide a reaction member when locked to the spindle and a gear selector key disposed radially inwardly of the sun pinions and adapted for selective cooperative engagement with one of the sun pinions on movement of the selector key in the axial direction of the hub in order to lock the corresponding sun pinion to the spindle to provide the reaction member, the selector key including a support rod, first and second body parts mounted on the rod for limited relative movement in the axial direction thereof, and resilient means resisting the relative movement, wherein the key further controls the operative condition of the clutch and thereby the connection of the input member to one of the planet cage and the gear ring.

2. An epicyclic change speed gear as set forth in claim 1, each body part including an outward extending dog for cooperative engagement with splines provided internally of the sun pinions.

3. An epicyclic change speed gear as set forth in claim 1, the clutch comprising a clutch sleeve provided internally of a selector sleeve and between the selector sleeve and hub spindle, the clutch sleeve being moveable axially relative to the selector sleeve and there being resilient means between opposed formations on the clutch sleeve and selector sleeve, respectively, resisting movement of the clutch sleeve relative to the selector sleeve outwardly of the hub and the selector key being operative to displace the selector sleeve outwardly of the hub through the resilient means.

4. An epicyclic change speed gear as set forth in claim 3, the clutch sleeve having a radially outwardly directed lip at its inner end and the selector sleeve having an internal rib, the lip being an interference fit with the rib, and the resilient means comprising a helical compression spring interposed therebetween.

* * * * *